United States Patent
Smith et al.

(10) Patent No.: US 7,121,192 B2
(45) Date of Patent: Oct. 17, 2006

(54) PISTON RING COATING

(75) Inventors: Thomas J. Smith, Muskegon, MI (US); Steven J. Sytsma, Muskegon, MI (US)

(73) Assignee: Dana Corporation, Toledo, OH (US)

( * ) Notice: Subject to any disclaimer, the term of this patent is extended or adjusted under 35 U.S.C. 154(b) by 175 days.

(21) Appl. No.: 10/804,332

(22) Filed: Mar. 19, 2004

(65) Prior Publication Data

US 2004/0216606 A1    Nov. 4, 2004

Related U.S. Application Data

(60) Provisional application No. 60/456,628, filed on Mar. 21, 2003.

(51) Int. Cl.
 *F16J 9/28* (2006.01)
(52) U.S. Cl. .................................................. 92/223
(58) Field of Classification Search ............... 92/223
See application file for complete search history.

(56) References Cited

U.S. PATENT DOCUMENTS

| | | | |
|---|---|---|---|
| 5,001,965 A | 3/1991 | Ruddy et al. | |
| 5,124,397 A | 6/1992 | Kanazawa et al. | |
| 5,151,193 A * | 9/1992 | Grobe et al. | ............... 210/651 |
| 5,347,915 A | 9/1994 | Feistel | |
| 5,632,494 A | 5/1997 | Oka | |
| 5,713,324 A | 2/1998 | Frame et al. | |
| 5,750,266 A | 5/1998 | Sakata | |
| 6,207,236 B1 | 3/2001 | Araki et al. | |
| 6,293,764 B1 | 9/2001 | Baumann | |
| 6,328,536 B1 | 12/2001 | Zebuhr | |
| 6,357,755 B1 | 3/2002 | Feistel | |
| 6,457,722 B1 | 10/2002 | Feistel | |

OTHER PUBLICATIONS

Kirk-Othmer Encyclopedia of Chemical Technology C 1993; from www.mrw.interscience.wiley.com/kirk/articles/therwolf.ao1/sect3.html, pp. 1-2.*

* cited by examiner

*Primary Examiner*—F. Daniel Lopez
(74) *Attorney, Agent, or Firm*—Rader, Fishman & Grauer PLLC

(57) ABSTRACT

A system and method for reducing microwelding of a piston ring installed in a circumferential groove of a piston, wherein the ring has at least one piston groove engaging surface which is coated with a polyaryletherketone polymer. This composition provides critical lubrication during the piston and piston ring break-in period and prevents localized high pressure, and high temperature areas that promote microwelding.

14 Claims, 1 Drawing Sheet

PISTON RING COATING

CLAIM TO PRIORITY

This application claims the benefit of U.S. Provisional Application No. 60/456,628, filed on Mar. 21, 2003, the entire contents of which are incorporated herein by reference.

BACKGROUND OF THE INVENTION

1. Field of the Invention

The present invention relates to lubricant compositions and more particularly to lubricant compositions for use in coating piston rings installed in internal combustion engines.

2. Description of the Related Art

Great strides have been made in extending the useful life of the internal combustion engine. Many of these improvements have been made possible by utilizing materials which reduce the friction between moving components used within the internal combustion engine. For example, coating the cylinder wall engaging surface of a piston ring with polytetrafluoroethylene (PTFE) or a composition of a thermoset resin, polytetrafluoroethylene, and molydisulfide to reduce the sliding friction between the piston ring and the cylinder wall is a known technique for reducing engine friction. It is also known to deposit PTFE or the composition of the thermoset resin, polytetrafluoroethylene, and molydisulfide between the rod bearings and the respective crank journal faces of an internal combustion engine to minimize friction.

In spite of these advancements, there still remains several friction intense areas of conventional engine designs which have not been adequately solved using even the most advanced friction reducing coatings. One such problem area relates to the interface between pistons and piston rings of internal combustion engines.

In the vast majority of internal combustion engines which use reciprocating pistons, the pistons are surrounded by piston rings to create a relatively efficient gas seal between the piston and the cylinder wall. Thus, when a charge within the engine cylinder is ignited, creating high combustion chamber pressures, the expanding gasses which are formed during the burning process are confined to the combustion chamber. The confined gases exert a downward force on the piston and are not permitted to escape between the piston and the cylinder wall. Although the piston ring is typically captured within a groove which is cut along an outside circumferential surface of the piston, the ring is sized relative to the groove so that is free to move within the groove. It is important that the piston ring be movable (axially, radially, and circumferentially) with respect to the groove because its relative movement enables proper sealing to the cylinder bore as the piston moves axially and radially, and as the ring traverses distortion in the cylinder wall.

There is a critical time period for new engines known as the break-in period during which the moving surfaces of joined components adjust to matingly conform to one another. During this break-in period the piston/piston ring interface is particularly susceptible to a condition known as microwelding, wherein there is a propensity for the piston aluminum to transfer to the sides (typically the lower flank of the piston ring.

If during break-in, the piston ring can be kept free to move relative to the walls of the piston groove, and localized contact pressure reduced by merit of a relatively elastic material, the piston groove/piston ring will mate uniformly and microwelding will not occur.

SUMMARY OF THE INVENTION

The present invention is directed to a system for preventing microwelding of a ring to a piston and includes a ring which is coated with a polyaryletherketone polymer.

The present invention is also directed to a system for preventing microwelding of a ring to a piston and includes a piston which is adapted to reciprocate within a combustion chamber of an engine. The piston has an outer surface with a circumferential groove disposed therein. A ring is disposed within the circumferential groove, the ring including a cylinder wall engaging surface and a piston groove engaging surface. The piston groove engaging surface is coated with a polyaryletherketone polymer. Preferably, the ring includes a radially extending upper surface and a radially extending lower surface, wherein the piston groove engaging surface includes the lower surface of the ring.

The present invention is also directed to a method for preventing microwelding of a piston to the ring. A composition comprising a polyaryletherketone is deposited on a surface of a piston ring. The composition is preferably cured by exposing the piston ring to an elevated temperature for a predetermined period of time.

DESCRIPTION OF THE PREFERRED EMBODIMENT

Figure 1:
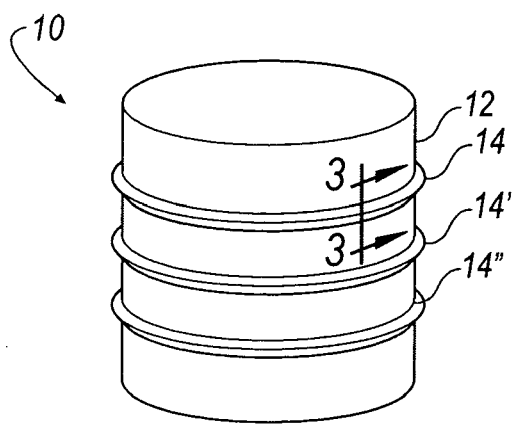
FIG. 1 is the piston ring of the present invention installed in a circumferential groove of a piston.
Figure 2:
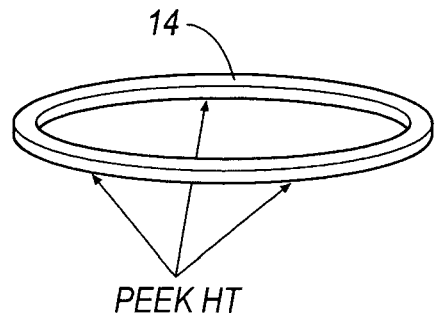
FIG. 2 is a first embodiment of the piston ring of the present invention.
Figure 3:
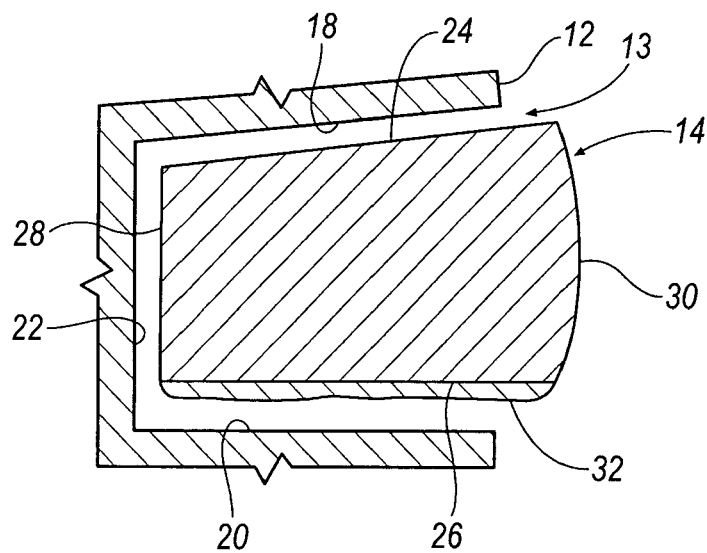
FIG. 3 is a partial cross-sectional view taken along lines 3—3 of FIG. 1.

In a preferred system 10 of the present invention, as shown in FIG. 1, a piston 12 is fitted with at least one circumferential groove 13 (see FIG. 3). Groove 13 is defined by upper and lower radially extending walls 18, 20 respectively and a vertical wall 22. A piston ring 14 is typically installed within groove 13. It is not uncommon for piston 12 to have two or more rings 14, 14', 14" to ensure efficient sealing of combustion chamber gasses and to also ensure the minimal flow of lubricating oil into the combustion chamber from the engine crank case.

Figure 4:
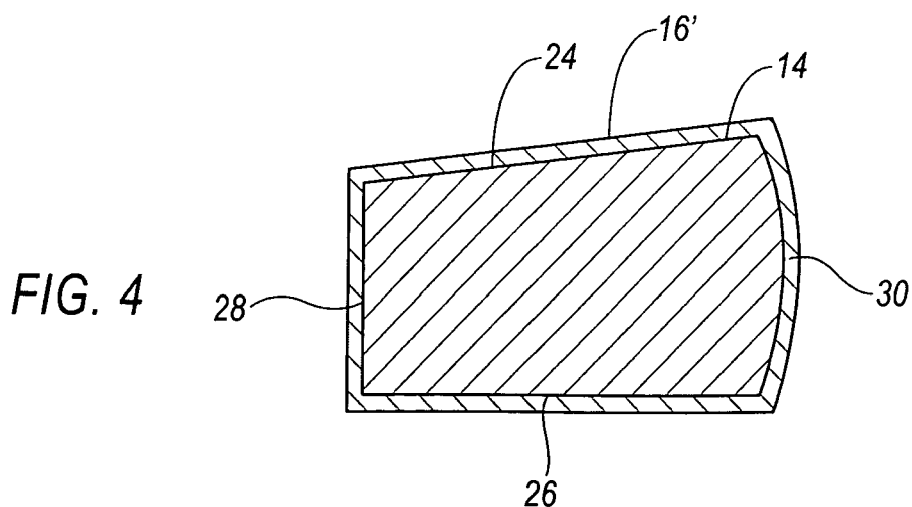
FIG. 4 is a second embodiment of the preferred piston ring of the present invention.

As shown in FIG. 3, a first embodiment of piston ring 14 includes upper and lower radially extending surfaces 24, 26, a radially inner vertical surface 28, and a radially outer cylinder wall engaging surface 30. Lower surface 26 is coated with a composition 32 comprising a polyaryletherketone polymer. In a second embodiment, shown in FIG. 4, the entire outside surface offing 14 is coated with a composition 32' comprising a polyaryletherketone. The composition is currently marketed under the trade name of PEEK-HT™, as is commercially available from Victrex® plc, Lancashire, United Kingdom (www.victrex.com). Specifically, PEEK-HT™ is a thermoplastic polymer with a repeat unit that comprises oxy-1,4-phenylene-oxy-1,4-phenylene-carbonyl-1,4 phenylene.

PEEK-HT™ has excellent friction and wear properties and is normally applied to parts to reduce wear. In the case of the present invention, however, it is used to permit ring 14 to move relative to walls 18, 20 and 22 of piston groove 13 and to reduce peak ring to groove contact pressures, thereby preventing microwelding. In some extremely demanding applications, it may be necessary to coat piston ring surfaces 24, 26, 28, and 30 with PEEK-HT™. However, current testing indicates that in most applications it is only necessary to coat lower engagement surface 26 of piston ring 14 to prevent microwelding. After the break-in period has expired, the PEEK-HT lasts longer than conventional coatings and provides a longer term microweld protection as compared to conventional coatings, such as XYLAN® 1620, and may continue to prevent microwelding.

PEEK-HT™ prevents microwelding from occurring by allowing the piston groove surfaces and the piston ring to move relative to one another and by reducing peak contact pressure. Thus, uniform mating is promoted throughout the critical engine break-in period. PEEK-HT™ reduces or eliminates direct contact between ring 14 and piston groove walls 18, 20, and 22. Piston ring 14 is typically formed from ductile cast iron or steel. Piston 12 is typically formed from aluminum alloy. By separating the dissimilarly composed piston 12 and ring 14 during the critical break-in period, the heat transfer between them is made uniform at the interface between ring 14 and walls 18, 20 and 22 of the piston groove. Thus, the two surfaces conform to one another without the high localized pressures and temperatures which might otherwise be experienced if not for the presence of the PEEK-HT™.

It is preferred that the PEEK-HT™ be applied to the ring surface or surfaces rather than walls 18, 20, 22 of piston groove 13. It is much easier to control the thickness and the placement of the PEEK-HT™ coating when the PEEK-HT™ is deposited on the piston ring 14 as opposed to the walls of the piston groove. Additionally, when applied to the piston 12, PEEK-HT™ may act as a thermal barrier, resulting in too much heat resistance in the piston and possible piston failure. Further, if the softer aluminum of piston groove 13 were coated, PEEK-HT™ may undesireably separate from walls 18, 20, and 22 during the critical break-in period.

Preferably, the PEEK-HT™ is applied to the piston ring by way of dipping, spraying, rolling, or the like, to deposit a precise, desired thickness of PEEK-HT™ on the piston ring. Thereafter, the ring is cured in an oven in accordance with the recommendations of the manufacturer of the PEEK-HT™. For example, the PEEK-HT™ can be applied by means of dipping and then the rings are cured for approximately ten minutes at an approximate temperature of 232° C.

Test were conducted to determine the effectiveness of using PEEK-HT™ on the piston ring to reduce microwelding between the piston ring 14 and the piston groove walls 18, 20, and 22. The results of the testing indicated that the use of PEEK-HT™ produced a microweld rating of 2.6 for a PEEK-HT™ coated, twisted piston ring, as compared to a microweld rating of 3.6 for an uncoated, non-twisted piston ring, a microweld rating of 4.4 for an uncoated, twisted piston ring, and a microweld rating of 4.8 for a tin plated, twisted piston ring. These results verified the unexpected results of dramatically reducing the microweld rate as compared to a conventional coated or uncoated piston ring.

While the invention has been specifically described in connection with certain specific embodiments thereof, it is to be understood that this is by way of illustration and not of limitation, and the scope of the appended claims should be construed as broadly as the prior art will permit.

What is claimed is:

1. A system for reducing microwelding of a piston ring to a piston, comprising:
   a piston ring having a surface coated with a composition of a polyaryletherketone polymer.

2. The system of claim 1, wherein said piston ring includes a cylinder wall engaging surface and at least one piston groove engagement surface wherein only said piston groove engagement surface is coated with said composition.

3. The system of claim 2, wherein said piston ring includes an upper radially extending surface and a lower radially extending surface, wherein said piston groove engaging surface of said piston ring comprises said lower surface.

4. The system of claim 1 wherein said ring is comprised of cast iron.

5. The system of claim 1, wherein said ring is comprised of steel.

6. The, system of claim 1, wherein the polyaryletherketone polymer comprises repeating units of oxy-1,4-phenylene-oxy-1,4-phenylene-carbonyl-1,4 phenylene.

7. A system for reducing microwelding of a piston ring to a piston, comprising:
   a piston adapted to reciprocate within a combustion chamber of an engine, wherein said piston includes walls extending radially inwardly from an outer radial surface of said piston, said walls defining a circumferential groove; and
   a piston ring disposed within said circumferential groove, said ring including a cylinder wall engaging surface and at least one piston groove engaging surface, wherein at least one of said piston groove engaging surface of said ring and said circumferential piston groove is coated with a composition of a polyaryletherketone polymer.

8. The system of claim 7, wherein said piston is comprised of aluminum.

9. The system of claim 8, wherein said ring is comprised of one of cast iron and steel.

10. The system of claim 7, wherein said ring includes an upper radially extending surface and a lower radially extending surface, wherein said piston groove engaging surface comprises said lower radial surface.

11. The system of claim 7, wherein the polyaryletherketone polymer comprises repeating units of oxy-1,4-phenylene-oxy-1,4-phenylene-carbonyl 1,4 phenylene.

12. A method for reducing microwelding of a ring to a piston, comprising the steps of:
   depositing on a surface of a piston ring a composition comprising a polyaryletherketone polymer, and
   curing said composition by exposing said piston ring to an elevated temperature for a predetermined period of time.

13. The method of claim 12, wherein said depositing step further includes depositing said composition only on a bottom portion of said piston ring.

14. The method of claim 12, wherein the polyaryletherketone polymer comprises repeating units of oxy-1,4-phenylene-oxy-1,4-phenylene-carbonyl 1,4 phenylene.

* * * * *